(12) United States Patent
Asif et al.

(10) Patent No.: US 10,841,630 B2
(45) Date of Patent: *****Nov. 17, 2020

(54) VIDEO ENCODING AND TRANSCODING FOR MULTIPLE SIMULTANEOUS QUALITIES OF SERVICE

(71) Applicant: International Business Machines Corporation, Armonk, NY (US)

(72) Inventors: Amir Asif, Toronto (CA); Alicia E. Chin, Markham (CA); Yonggang Hu, Toronto (CA); Zhenhua Hu, Toronto (CA); Vida Movahedi, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,706

(22) Filed: Jan. 8, 2020

(65) Prior Publication Data
US 2020/0145703 A1    May 7, 2020

Related U.S. Application Data

(63) Continuation of application No. 16/194,132, filed on Nov. 16, 2018, now Pat. No. 10,595,063, which is a
(Continued)

(51) Int. Cl.
*H04L 29/06*          (2006.01)
*H04N 21/236*         (2011.01)
(Continued)

(52) U.S. Cl.
CPC .  *H04N 21/23605* (2013.01); *H04N 21/23439* (2013.01); *H04N 21/23655* (2013.01);
(Continued)

(58) Field of Classification Search
None
See application file for complete search history.

(56) References Cited

U.S. PATENT DOCUMENTS 8,331,365 B2   12/2012  Rey et al.
10,200,727 B2   2/2019  Asif et al.
(Continued)

FOREIGN PATENT DOCUMENTS

WO      2009154704 A1    12/2009

OTHER PUBLICATIONS

List of IBM Patents or Patent Applications Treated as Related.
(Continued)

*Primary Examiner* — Ayanah S George
(74) *Attorney, Agent, or Firm* — Zilka-Kotab, P.C.

(57) ABSTRACT

A computer-implemented method, according to one embodiment, includes: splitting a video stream into a plurality of sub-streams, and encoding each of the sub-streams. A packet is also transmitted to a receiver, where the packet includes a number of the encoded sub-streams. Moreover, the number of the encoded sub-streams that are included in the packet transmitted to the receiver corresponds to a quality of service associated with a service cost incurred by the receiver. Other systems, methods, and computer program products are described in additional embodiments.

20 Claims, 9 Drawing Sheets

Related U.S. Application Data continuation of application No. 15/473,463, filed on Mar. 29, 2017, now Pat. No. 10,200,727.

(51) Int. Cl.
  *H04N 21/2365* (2011.01)
  *H04N 21/2343* (2011.01)
  *H04N 21/24* (2011.01)

(52) U.S. Cl.
  CPC ............ *H04N 21/234309* (2013.01); *H04N 21/234363* (2013.01); *H04N 21/2407* (2013.01)

(56) References Cited

U.S. PATENT DOCUMENTS

| | | | |
|---|---|---|---|
| 10,595,063 | B2 | 3/2020 | Asif et al. |
| 2006/0277039 | A1 | 12/2006 | Vos et al. |
| 2006/0291392 | A1 | 12/2006 | Alicherry et al. |
| 2009/0257736 | A1* | 10/2009 | Mizuno ............... H04N 19/154 386/248 |
| 2010/0067580 | A1* | 3/2010 | Sachdeva ............... H04N 19/40 375/240.16 |
| 2010/0281042 | A1 | 11/2010 | Windes et al. |
| 2012/0131138 | A1 | 5/2012 | Swenson et al. |
| 2014/0269917 | A1 | 9/2014 | Van der Laan |
| 2015/0229970 | A1 | 8/2015 | Ma et al. |
| 2018/0288451 | A1 | 10/2018 | Asif et al. |
| 2019/0090000 | A1 | 3/2019 | Asif et al. |

OTHER PUBLICATIONS

Pereira et al., "An Architecture for Distributed High Performance Video Processing in the Cloud," 2013 IEEE Sixth International Conference on Cloud Computing, 2010, pp. 1-8.
Kim et al., "Towards Efficient Design and Implementation of a Hadoop-based Distributed Video Transcoding System in Cloud Computing Environment," International Journal of Multimedia and Ubiquitous Engineering, vol. 8, No. 2, Mar. 2013, pp. 213-224.
Zheng et al., "A rate control scheme for distributed high performance video encoding in cloud," International Conference on Cloud and Service Computing, Dec. 2011, pp. 131-133.
Lin et al., "A framework for scalable cloud video recorder system in surveillance environment," 9th International Conference on Ubiquitous Intelligence and Computing and 9th International Conference on Autonomic and Trusted Computing, Sep. 2012, pp. 655-660.
Tan et al., "An approach for fast and parallel video processing on apache Hadoop clusters," IEEE International Conference on Multimedia and Expo (ICME), Jul. 2014, pp. 1-7.
Ryu et al., "Extensible Video Processing Framework in Apache Hadoop," IEEE International Conference on Cloud Computing Technology and Science, Dec. 2013, pp. 305-308.
Zhang et al., "A video cloud platform combing online and offline cloud computing technologies," Personal Ubiquitous Computing, vol. 19, No. 7, Oct. 2015, pp. 1099-1110.
Liu et al., "A Distributed Video Management Cloud Platform Using Hadoop," Access, IEEE, vol. 3, Dec. 11, 2015, pp. 2637-2643.
Sze et al., "High Efficiency Video Coding (HEVC) Algorithms and Architectures," Springer International Publishing, 2014, pp. 1-384.
Chi et al., "Parallel Scalability and Efficiency of HEVC Parallelization Approaches," IEEE Transactions on Circuits and Systems for Video Technology, vol. 22, No. 12, Dec. 2012, pp. 1827-1838.
Movahedi et al., "A Novel Development Infrastructure for Scalable Video Coding/Transcoding Applications," Data Compression Conference, 2016, 1 page.
Asif et al., U.S. Appl. No. 15/473,463, filed Mar. 29, 2017.
Non-Final Office Action from U.S. Appl. No. 15/473,463, dated Apr. 17, 2018.
Notice of Allowance from U.S. Appl. No. 15/473,463, dated Sep. 26, 2018.
Asif et al., U.S. Appl. No. 16/194,132, filed Nov. 16, 2018.
Corrected Notice of Allowance from U.S. Appl. No. 15/473,463, dated Nov. 6, 2018.
Notice of Allowance from U.S. Appl. No. 16/194,132, dated Nov. 8, 2019.

* cited by examiner

VIDEO ENCODING AND TRANSCODING FOR MULTIPLE SIMULTANEOUS QUALITIES OF SERVICE

BACKGROUND

The present invention relates to data compression, and more specifically, this invention relates to video multicasting with multiple simultaneous qualities of service.

As mobile devices become more prevalent, users have developed an increased reliance on such mobile devices for streaming online content. Accordingly, being able to deliver video content having high quality, while using a reduced amount of network bandwidth, and at low latency are desired selling points for service providers. Data compression is often incorporated in an effort to achieve such characteristics.

The process of reducing the size of a data file is referred to as data compression. In signal processing, data compression, source coding, or bit-rate reduction involves encoding information using fewer bits than the original representation. Data compression can be either lossy or lossless. Lossless data compression reduces bits by identifying and eliminating statistical redundancy for which no information is lost. However, lossy data compression reduces the number of bits by removing some of the less relevant information.

Data compression reduces the amount of resources used to store and transmit data. Computational resources are consumed in the compression process and, usually, in the reversal of the compression process (decompression). The architecture of data compression schemes involves trade-offs among various factors, including the degree of compression, the amount of distortion introduced, and the computational resources required to compress and decompress the data. As such, conventional video compression techniques are unable to achieve video content having high quality with some assurance of service quality, while also using a reduced amount of network bandwidth, and at low latency.

SUMMARY

A computer-implemented method, according to one embodiment, includes: splitting a video stream into a plurality of sub-streams, and encoding each of the sub-streams. A packet is also transmitted to a receiver, where the packet includes a number of the encoded sub-streams. Moreover, the number of the encoded sub-streams that are included in the packet transmitted to the receiver corresponds to a quality of service associated with a service cost incurred by the receiver.

A computer program product, according to another embodiment, includes a computer readable storage medium having program instructions embodied therewith. The program instructions are readable and/or executable by a processor to cause the processor to: perform the foregoing method.

A computer-implemented method, according to yet another embodiment, includes: receiving a packet which includes a number of encoded sub-streams split from a video stream. Each of the encoded sub-streams are decoded, and merged to create a merged version of the video stream. The merged version of the video stream has a video quality which corresponds to a quality of service associated with the receiver, and the quality of service associated with the receiver corresponds to a service cost incurred by the receiver.

A computer program product, according to another embodiment, includes a computer readable storage medium having program instructions embodied therewith. The program instructions are readable and/or executable by a processor to cause the processor to perform the foregoing method.

A computer-implemented method, according to yet another embodiment, includes: receiving a packet which includes a number of encoded sub-streams split from a video stream. Each of the encoded sub-streams are further decoded. Each of the decoded sub-streams individually provides a unique version of the video stream having a lower video quality. However, merging more than one of the decoded sub-streams provides a merged version of the video stream having a relatively higher video quality. Accordingly, the decoded sub-streams are merged to create a merged version of the video stream, the merged version having a video quality which corresponds to a quality of service associated with the receiver. The quality of service associated with the receiver also corresponds to a service cost incurred by the receiver.

Other aspects and embodiments of the present invention will become apparent from the following detailed description, which, when taken in conjunction with the drawings, illustrate by way of example the principles of the invention.

DETAILED DESCRIPTION

Figure 1:
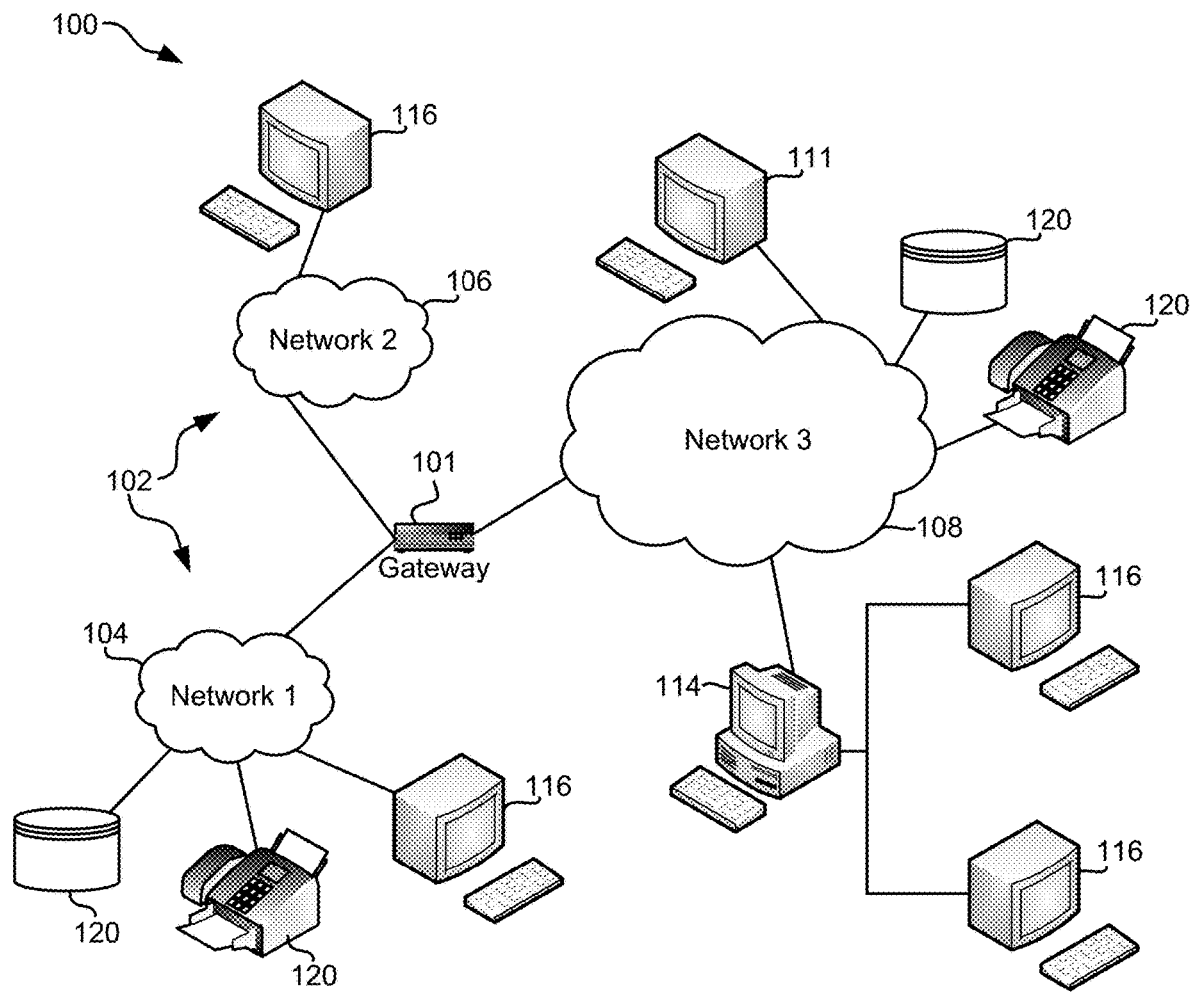
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for achieving improved video content delivery characteristics. Various embodiments described herein may be able to perform parallel encoding (or transcoding) of video sequences in a distributed environment while also providing multiple simultaneous and error-resilient qualities of service. Moreover, some of the embodiments included herein may even be able to implement an adjustable quality of service aspect, e.g., as will be described in further detail below.

In one general embodiment, a computer-implemented method includes: splitting a video stream into a plurality of sub-streams, encoding each of the sub-streams in parallel, and transmitting a packet to a receiver, where the packet includes a number of the encoded sub-streams. Each of the sub-streams individually provide a unique version of the video stream having a lower video quality, while merging more than one of the sub-streams provides a merged version of the video stream having a relatively higher video quality. Moreover, the number of the encoded sub-streams included in the packet transmitted to the receiver corresponds to a quality of service associated with the receiver.

In another general embodiment, a computer program product includes a computer readable storage medium having program instructions embodied therewith, where the computer readable storage medium is not a transitory signal per se, the program instructions readable and/or executable by a processor to cause the processor to perform a method which includes: receiving, by the processor, a packet which includes a number of encoded sub-streams split from a video stream; decoding, by the processor, each of the encoded sub-streams; and merging, by the processor, the decoded sub-streams to create a merged version of the video stream. Each of the decoded sub-streams individually provides a unique version of the video stream having a lower video quality, and merging more than one of the decoded sub-streams provides a merged version of the video stream having a relatively higher video quality. Moreover, the merged version of the video stream has a video quality which corresponds to a quality of service associated with the receiver.

In yet another general embodiment, a computer program product includes a computer readable storage medium having program instructions embodied therewith, where the computer readable storage medium is not a transitory signal per se, the program instructions readable and/or executable by a processor to cause the processor to perform a method which includes: splitting, by the processor, a video stream into a plurality of sub-streams; encoding, by the processor, each of the sub-streams in parallel; and transmitting, by the processor, a packet to a receiver, where the packet includes a number of the encoded sub-streams. Each of the sub-streams individually provide a unique version of the video stream having a lower video quality, and merging more than one of the sub-streams provides a merged version of the video stream having a relatively higher video quality. Moreover, the number of the encoded sub-streams included in the packet transmitted to the receiver corresponds to a quality of service associated with the receiver.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
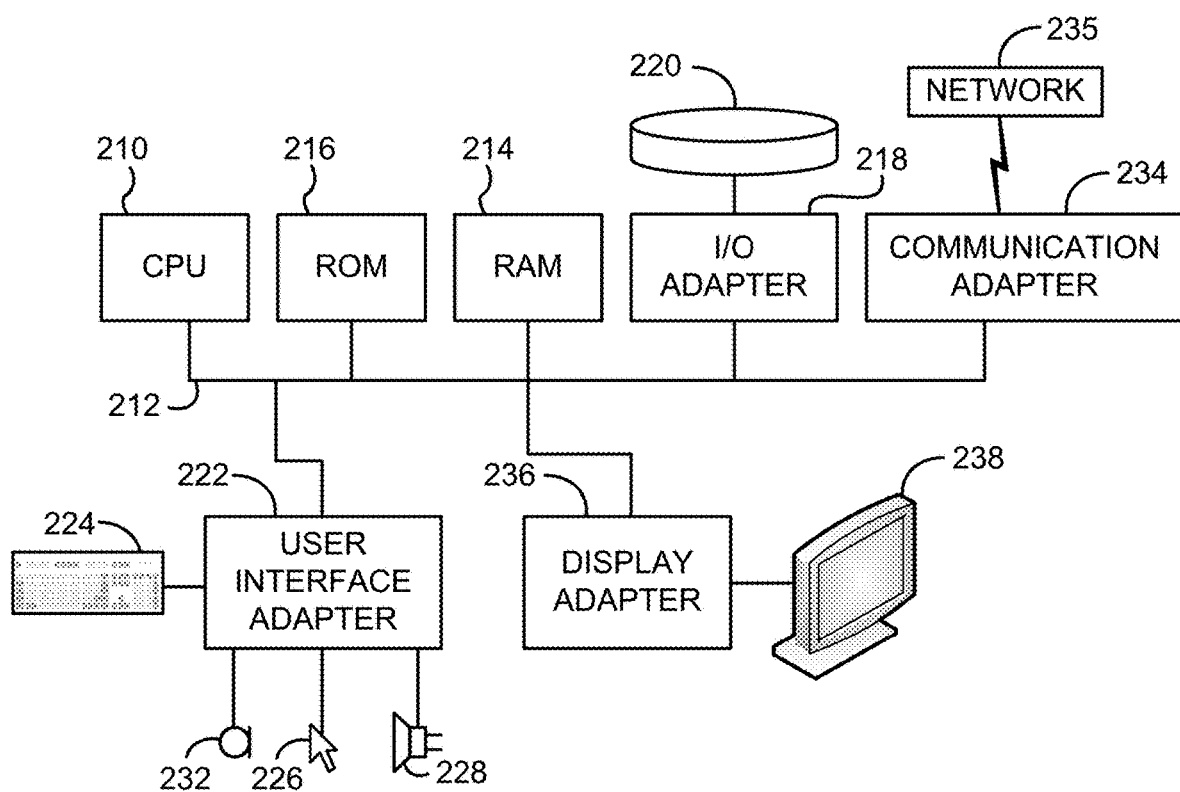
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
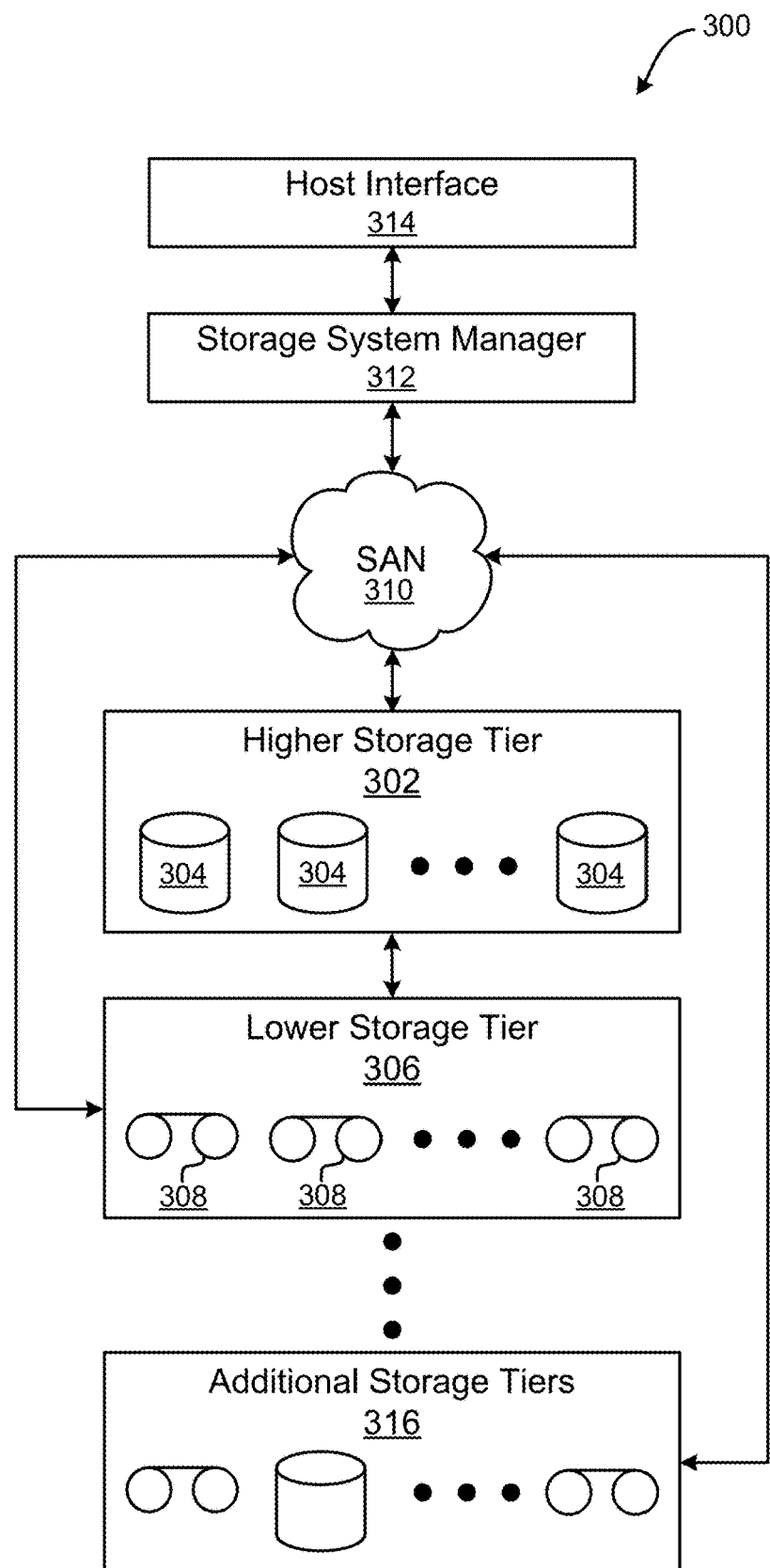
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Again, as mobile devices become more prevalent, users have developed an increased reliance on such mobile devices for streaming online content. Accordingly, being able to deliver video content having high quality, while using a reduced amount of network bandwidth, and at low latency are desired selling points for service providers. However, conventional video compression techniques are unable to achieve these desirable video content delivery characteristics.

In sharp contrast, various embodiments described herein include video compression techniques which are able to achieve improved video content delivery characteristics. Some approaches are even able to achieve different qualities of service aspects in a same encoding step (pass), e.g., as will be described in further detail below.

Figure 4:
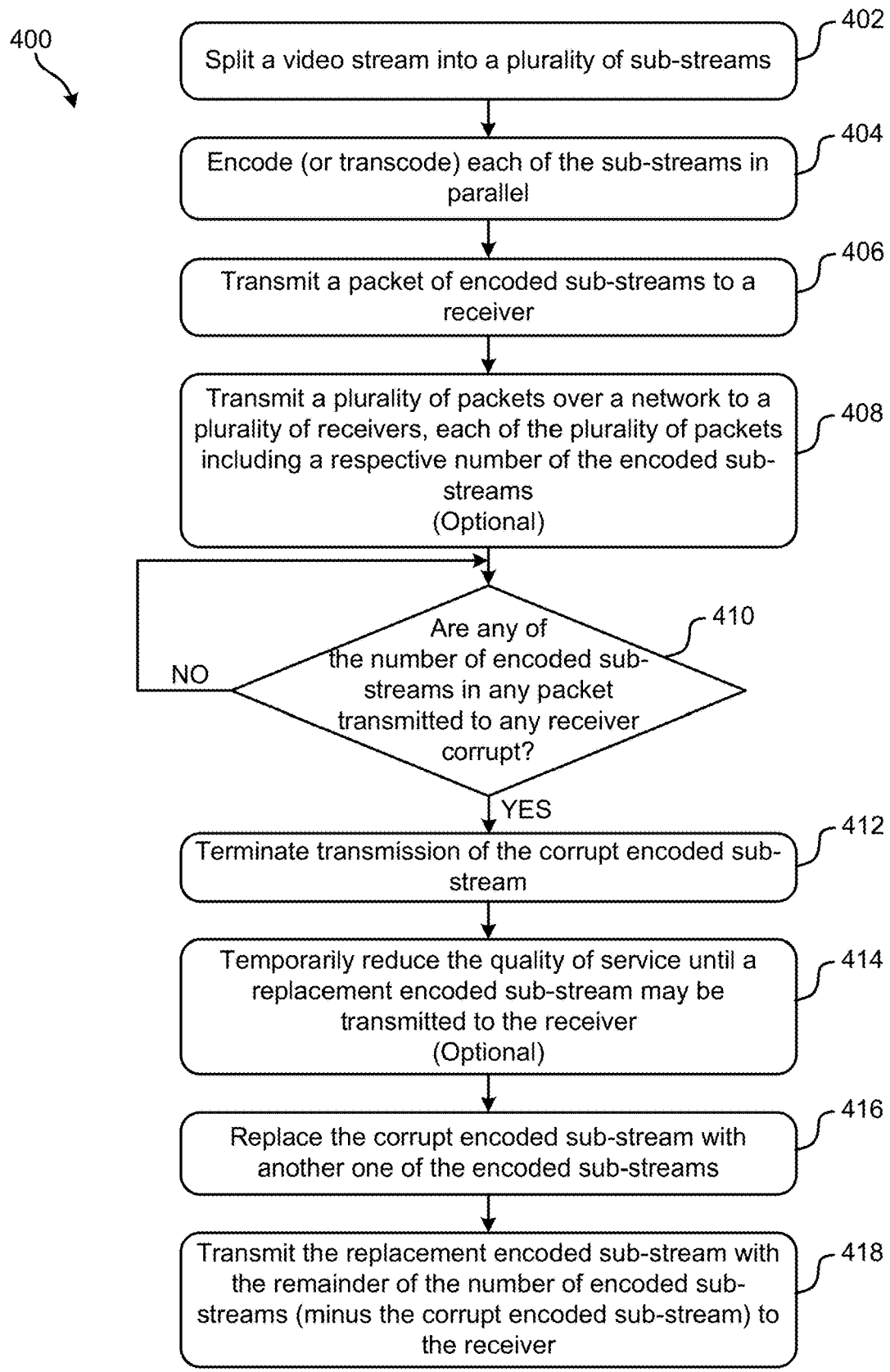
FIG. 4 is a flowchart of a method in accordance with one embodiment.

Referring to FIG. 4, a flowchart of a computer-implemented method 400 for encoding video sequences in parallel while providing multiple simultaneous and error-resilient qualities of service, is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Figure 7:
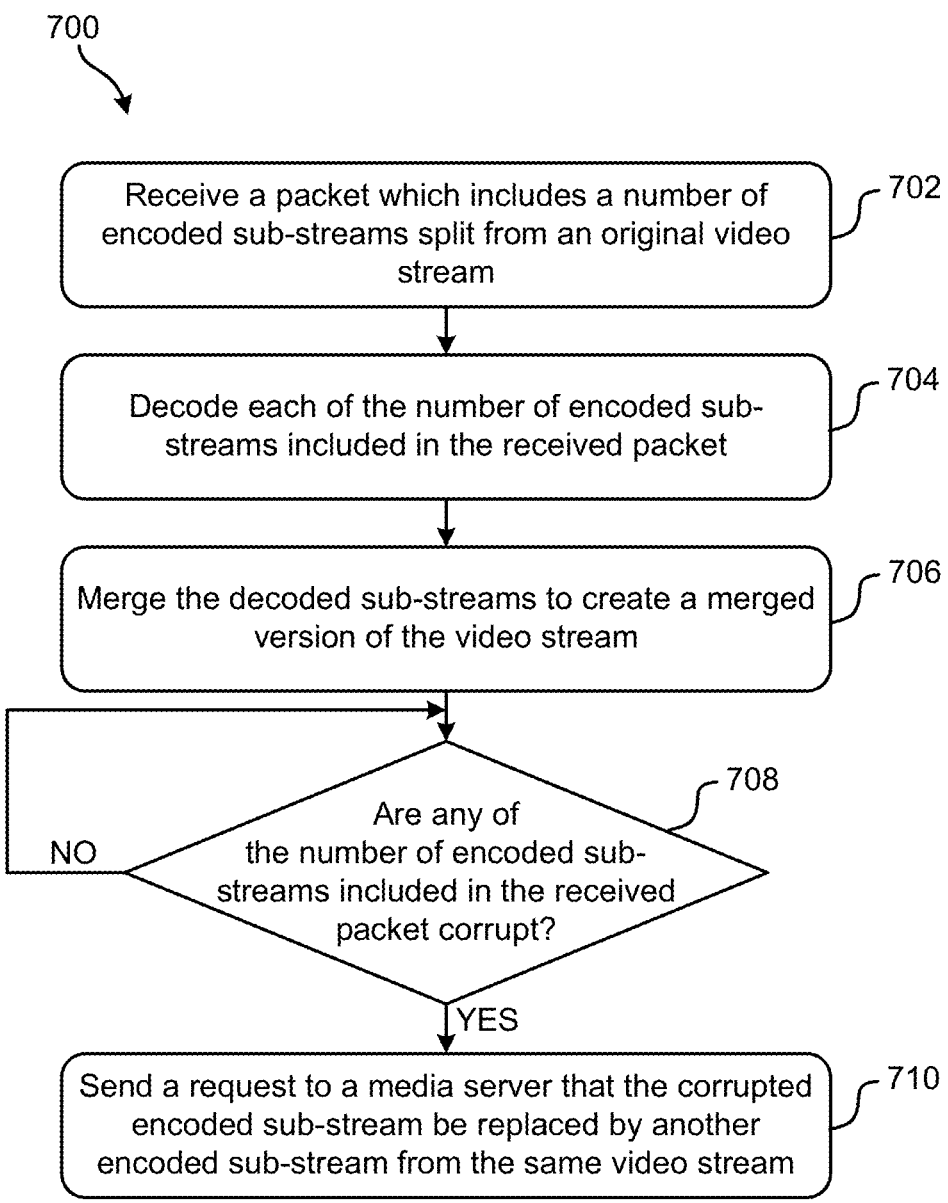
FIG. 7 is a flowchart of a method in accordance with one embodiment.

It should be noted that the operations included in method 400 are described from the perspective of a media server, but may be performed by any appropriate component in a media delivery system, including a media receiver (e.g., see FIG. 7). Accordingly, each of the steps of the method 400 may be performed by any suitable component of the operating environment. For example, in various embodiments, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, operation 402 of method 400 includes splitting a video stream into a plurality (e.g., a set) of sub-streams. The video stream may be received from any number of different sources depending on the approach. According to some approaches, the video stream may be received at a media (e.g., video) splitter module from a decoder module which has decoded an encoded video file. In other approaches, the video stream may be a raw video file received at a media splitter from a storage database, a live video file received at a media splitter from a remote media capturing device with broadcasting capabilities, etc.

When the video stream is split, it is preferred that each of the sub-streams is individually able to provide a unique version of the video stream having a lower video quality. In other words, it is preferred that the video stream is split such that each of the sub-streams may each be able to provide a low quality version of the video stream without being merged with any of the other sub-streams. However, merging more than one of the sub-streams provides a merged version of the video stream having a relatively higher video quality relative to each sub-stream individually.

Figures 5A, 5B, 5C:
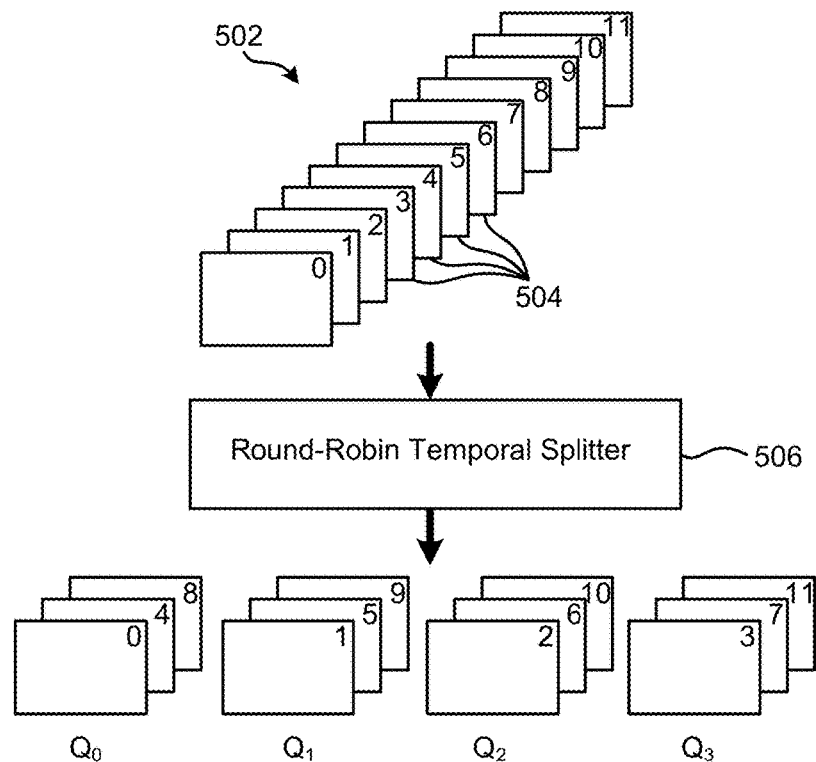
FIG. 5A is a representational diagram of a round-robin temporal splitting process in accordance with one embodiment.
FIG. 5B is a representational view of independent random access points of different sub-streams from FIG. 5A in accordance with one embodiment.
FIG. 5C is a representational view of independent random access points having modified starting points for different sub-streams from FIG. 5A in accordance with one embodiment.

According to some approaches, operation 402 of FIG. 4 may include performing a temporal round-robin splitting of the video stream in order to achieve a plurality of sub-streams having the above mentioned desired characteristics. Referring momentarily to FIG. 5A, an exemplary implementation of a temporal round-robin splitting process is shown according to one embodiment, which is in no way intended to limit the invention. As shown, a video stream 502 is made up of a series of images 504 which, when shown together in series (e.g., on a display), form the video stream. One or more of the images included in a video stream may also be referred to herein as "frame" or "frames". Each of the images 504 are passed through a round-robin temporal splitter 506 which splits the video stream 502 into groups of the images, or groups of pictures (GOPs), where each group of the images forms a sub-stream. In this example, each of the sub-streams $Q_0$-$Q_3$ includes three different images from the original video stream 502. It should be noted that in other embodiments, the number of sub-streams and/or the number of different images in each of the sub-streams themselves may vary, e.g., depending on the video stream size (amount of data).

As described above, any one of the four sub-streams $Q_0$-$Q_3$ may desirably be able to provide a low quality version of the video stream 502 without being merged with any of the other sub-streams $Q_0$-$Q_3$. According to the present description, a "low quality version" of the video stream 502 refers to the number of images (frames) included in the sub-stream compared to the number of images included in the original video stream 502. For the present embodiment depicted in FIG. 5A, each of the sub-streams $Q_0$-$Q_3$ include three images of the original twelve images included in the video stream 502. Moreover, the three images included in each of the respective sub-streams $Q_0$-$Q_3$ were selected from the video stream 502 in a round-robin fashion and thereby span evenly along the length (e.g., span) of the video stream 502. As a result, each of the respective sub-streams $Q_0$-$Q_3$ provide a functional version of the video stream 502 having a lower number of images (frames), or a "low quality version" of the video stream.

However, merging more than one of the sub-streams $Q_0$-$Q_3$ may provide a merged version of the video stream having a relatively higher video quality relative to each sub-stream individually. For example, sub-stream $Q_2$ may individually provide a low quality version of the original video stream 502, as sub-stream $Q_2$ only includes three of the original twelve images (frames) included in the whole video stream 502. Yet, merging sub-stream $Q_2$ with sub-stream $Q_3$ doubles the number of images included in the resulting merged sub-stream, thereby effectively doubling the achieved resolution compared to either of sub-streams $Q_2$ and $Q_3$ individually. Similarly, merging sub-stream $Q_2$ with sub-stream $Q_3$, sub-stream $Q_4$ and sub-stream $Q_1$ quadruples the number of images included in the resulting merged sub-stream, thereby effectively quadrupling the achieved resolution compared to any of the sub-streams individually.

Moreover, the starting point of the sub-streams may further be modified in some approaches in order to improve the resulting random access as would be appreciated by one skilled in the art after reading the present description. As an example, FIG. 5B-5C illustrate the results of shifting the starting points of the sub-streams in a way that different qualities of service are effected differently. Looking first to FIG. 5B, starting points of the sub-streams are not shifted, and as a result, independent random access points are four sub-stream lengths apart (128 frames in this example). However, looking to FIG. 5C, starting points of the sub-streams have been shifted. Blank frames are added at the beginning of the video sequence to account for some of the shifting (represented by negative numbers in the present embodiment). The result is that independent random access points of about one sub-stream length apart (32 frames in this example) to a lowest quality of service, about sub-stream lengths apart for a middle quality of service, and about four sub-stream lengths apart for the highest quality of service are achieved. Here, the sub-stream lengths are 32 frames. Therefore, for a video recorded at 32 frames per second, the 3 temporal qualities of service are available in less than 1, 2 and 4 seconds respectively after random access inquiry, allowing for gradual upgrade to higher qualities of service. In other words, improved access times to the sub-stream may be achieved even when accessing the sub-stream at a random position along its length. Moreover, sub-stream lengths may be set depending on the random access frequency associated with a given video and/or latency constraints.

Figure 6:
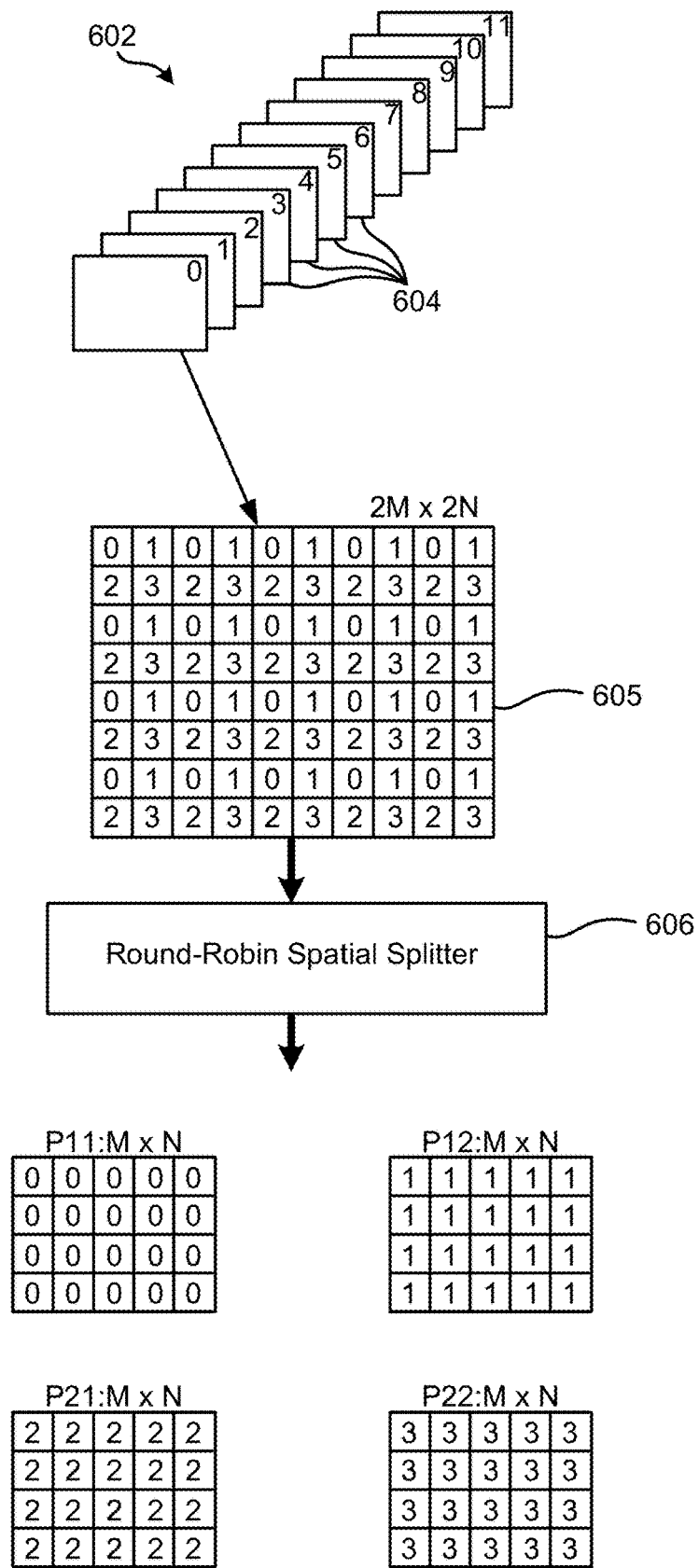
FIG. 6 is a representational diagram of a round-robin spatial splitting process in accordance with one embodiment.

Referring back to FIG. 4, in other approaches, operation 402 may include performing a spatial splitting of the video stream in order to achieve a plurality of sub-streams. Spatial splitting may be performed by selectively grouping certain pixels in each of the images included in the video stream. Referring momentarily to FIG. 6, an exemplary implementation of a spatial splitting process is shown according to one embodiment, which is in no way intended to limit the invention. As previously mentioned, a video stream 602 may be made up of a series of images 604 (e.g., frames) which, when shown together in series (e.g., on a display), form the video stream. The spatial splitting process selects certain ones of the pixels in each of the images 604 of the video stream 602 and groups the corresponding pixels taken from the same image together to form a lower resolution version of each of the images 604.

According to the present embodiment, each of the images 604 are passed through a round-robin spatial splitter 606 which assigns each of the pixels a reference number 1-4 in a repeating, grid-like fashion. In other words, each pixel in each image 604 of the video stream 602 is assigned a reference number based on its location across the given image. As mentioned above, pixels having the same reference number may be grouped together to form a lower resolution version of the given image 604, which has been illustrated here by pixel groupings P11, P12, P21, P22. Together, the pixel groupings P11, P12, P21, P22 for each of the images in the video stream may form sub-streams of the original video stream. It should be noted that in this example, the pixels in image 605 are shown as being separated into four different groupings, but in other embodiments, the amount of reference numbers used to separate pixels in the images may vary, e.g., depending on the size of the image, the desired detail in each of the groupings of pixels, user preference, etc.

Pixels assigned the same reference number are preferably evenly spaced across the image such that each of the groupings P11, P12, P21, P22 have about the same image resolution. As a result, each of the respective sub-streams may provide a functional version of the original video stream 602 having a lower number of pixels, or a "low quality version" of the video stream as previously mentioned. However, merging more than one of the sub-streams may provide a merged version of the video stream having a relatively higher video quality relative to each sub-stream individually. For example, sub-stream corresponding to pixel grouping P11 may individually provide a low quality version of the original video stream 602, as pixel grouping P11 only includes one fourth of the total number of pixels included in each of the images in the video stream 602. Yet, merging the sub-stream corresponding to pixel grouping P11 with the sub-stream corresponding to pixel grouping P12 doubles the spatial resolution of the resulting merged sub-stream compared to either of pixel groupings P11 and P12 individually. Similarly, merging sub-stream corresponding to pixel grouping P11 with sub-stream corresponding to pixel grouping P12, with sub-stream corresponding to pixel grouping P21 and sub-stream corresponding to pixel grouping P22 quadruples the number of pixels included in the resulting merged sub-stream, thereby effectively quadrupling the achieved quality compared to any of the pixel groupings individually. As a result, some approaches are able to deliver lower and higher resolution videos simultaneously.

It follows that a sub-stream alone or different combinations of the sub-streams may provide an independent, but lower quality, representation of the original video stream. In other words, any single sub-stream or different combinations of less than all of the sub-streams split from the same original video stream may be used (decoded, merged, etc.) to form independent representations of the original video stream. However, these independent representations from the different combinations do have a lower video quality than the original video stream, because all the information (images, pixels, etc.) from the original video stream is not represented in these different combinations as less than all of the sub-streams are used to form the resulting independent representations.

However, it should also be noted that in some embodiments, a spatial splitting process may be performed in addition to performing a temporal round-robin splitting of a video stream (e.g., see media splitter 806 of FIG. 8B below). For instance, the spatial splitting process may be performed on frames of the sub-streams obtained (formed) by the temporal round-robin splitting process. Alternatively, the temporal round-robin splitting may be performed on sub-streams formed by the spatial splitting process. By applying both spatial splitting and temporal splitting on video streams, multiple temporal and spatial qualities of service may simultaneously be provided as a result of performing only one round of encoding (or transcoding), e.g., as will soon become apparent.

Referring back now to FIG. 4, method 400 further includes encoding (or transcoding) each of the sub-streams in parallel. See operation 404. Thus, the sub-streams formed in operation 402 are preferably encoded (or transcoded) as parallel tasks in the same encoding step after they have been split from the original video stream, thereby resulting in significant improvements to efficiency. For instance, in some approaches a distributed system may be used to encode each of the sub-streams in parallel. Thus, sub-streams may be encoded or transcoded as parallel tasks that are executed in a media server farm of multiple computers. However, according to other approaches, any desired type of distributed computational resource and/or system may be used to perform the encoding of the sub-streams in parallel. For instance, a cluster and/or cloud computational network may be implemented as would be appreciated by one skilled in the art after reading the present description. It should also be mentioned that any known type of encoding and/or transcoding process may be implemented, e.g., depending on the desired embodiment.

It is preferred that the parallel encoding tasks are managed, e.g., in order to improve efficiency. This is particularly true for approaches implementing parallel encoding tasks across a distributed system. In some embodiments, a session and task scheduler may be used to schedule and prioritize the parallel encoding or transcoding workloads. In such approaches, each video stream or sub-stream may be managed by the session and task scheduler as a task-based session. As such, different streams and/or sub-streams may be treated as sessions (or tasks), each task-based session potentially having different priorities and/or scheduling policies applied thereto. Therefore managing the encoding performed in operation 404 of method 400 may include applying different management priorities and/or scheduling policies to each of the different sessions. Management priorities and/or scheduling policies may vary depending on the desired embodiment. For example, sub-streams split from a live video stream may be assigned a higher priority than sub-streams split from a redundant video stream. In another example, sub-streams corresponding to certain video streams may be assigned to a scheduling policy which designates a certain time when the sub-streams should be encoded. As a result, multiple video streams and/or sub-streams may be encoded or transcoded in a given system at the same time (e.g., in parallel).

With continued reference to FIG. 4, operation 406 includes transmitting a packet of encoded sub-streams to a receiver. In varied approaches, the packet of encoded sub-streams may be transmitted to the receiver over a wireless and/or wired network, e.g., including a LAN, a WAN such as the Internet, a cloud-based network, etc. Moreover, the packet may include any number of the encoded sub-streams. For example, in some approaches, a transmitted packet may only include a single sub-stream, while in other approaches, a transmitted packet may include several sub-streams split from the same video stream. As previously mentioned, more than one sub-stream split from the same original video stream may be merged together to form a higher video quality, at least compared to any of the sub-streams individually. It follows that the number of encoded sub-streams included in the packet transmitted to the receiver in operation 406 may correspond to a quality of service associated with the receiver.

A "quality of service" may generally be considered to be the overall performance experienced at the receiver location. To quantitatively measure a quality of service, one or more related aspects of the resulting video stream service may be considered, e.g., such as frame rate, resolution, error rate, throughput, transmission delay, availability, etc. For instance, the encoded or transcoded sub-streams may be transmitted over the network with the ability to adjust the transmission bitrate based on the available bandwidth. Accordingly, the different video qualities achievable by implementing temporal round-robin splitting and/or spatial splitting processes on a video stream may be utilized in preferred approaches to implement different qualities of services in various embodiments described herein. For instance, a lowest quality of service may correspond to only receiving one of the sub-streams split from an original video stream, while a highest quality of service may correspond to receiving all sub-streams split from a given video stream. Additional in-use embodiments are described below.

Optional operation 408 of method 400 includes transmitting a plurality of packets over a network to a plurality of receivers, each of the plurality of packets including a respective number of the encoded sub-streams. As mentioned above, each of the packets may correspond to a quality of service associated with the respective receiver at which the packet is being received. Therefore, the number of encoded sub-streams included in each of the packets transmitted may be used to differentiate between the different qualities of service associated with each of the receivers. However, it should be noted that other factors may play a role in determining how many sub-streams are included in a packet transmitted to a given receiver location. For example, depending on the hardware capabilities of a network over which the packets are transmitted, the bandwidth available on the network, the number of sub-streams available (e.g., if any sub-streams are corrupted), etc., a given number of the encoded or transcoded sub-streams may be transmitted to a given receiver. The number of encoded sub-streams included in the packet may even be adjusted in real time, e.g., based on one or more network conditions. Making adjustments to the number of encoded sub-streams included in a packet (even when done in real time) desirably does not cause any lapse in video reception, but may result in some controlled drops to the video quality perceived at the receiving location(s), e.g., after the sub-streams included in the packet are decoded, merged and displayed.

As alluded to above, in some instances one or more of the sub-streams may become corrupted, e.g., due to issues with the original video stream, the encoding process, etc. However, in addition to providing multiple simultaneous qualities of service, the present embodiment is error resilient. For instance, in the event that one of the sub-streams is corrupted over the network, there may be other redundant sub-streams available to switch to. Accordingly, decision 410 includes determining whether any of the number of encoded sub-streams in any packet transmitted to any receiver is corrupt. In some approaches, an encoded sub-stream may be determined to be corrupt by monitoring the encoded sub-streams transmitted to each of the receivers. In other approaches, a request to replace a corrupt sub-stream may be received from a receiver, thereby indicating that at least one of the sub-streams are corrupt.

As shown, method 400 returns to decision 410 in response to determining that none of the encoded sub-streams in any of the packets transmitted to any of the receivers are corrupt. As a result, method 400 may continue to check wither any of the transmitted encoded sub-streams are corrupt. Decision 410 may be performed by checking whether any corruption warnings from any of the receiver locations have been received, monitoring performance of the encoding or transcoding processes, sampling the sub-streams and/or the original video stream for errors, etc. This process may continue to be repeated, e.g., until a new video stream is received, all transmissions are terminated, upon receiving a user command, a predetermined condition being met, etc.

Alternatively, method 400 proceeds to operation 412 in response to determining that at least one of the number of the encoded sub-streams in the packets transmitted to the receivers is corrupt. There, operation 412 includes terminating transmission of the corrupt encoded sub-stream. However, in some approaches, all packets corresponding the encoded frame to which the corrupt packet belongs may simply be ignored (e.g., especially in case of video streaming of live events). If terminating transmission of the corrupt encoded sub-stream is implemented in a given approach, the number of sub-streams received at the corresponding receiver decreases, which thereby causes the quality of service at the receiver to decrease as well. Depending on the availability of replacement sub-streams, network throughput, system bandwidth, etc., the corrupt sub-stream may or may not be immediately replaceable. Thus, in some approaches, optional operation 414 may be performed whereby the quality of service associated with the receiver is temporarily reduced until a replacement encoded sub-stream may be transmitted to the receiver. For example, a media server farm may choose to lower the quality of service of the packet transmitted to a receiver by skipping the encoding (or transcoding) of some sub-streams in case of high load on the server farm. This decision may further be customized for the encoding tasks of clients with various assigned priorities managed by a scheduler. In some approaches, the receiver location may be given the option to extend the reduced quality of service which may also result in a reduced service cost.

However, when a replacement encoded sub-stream is available, operation 416 is preferably performed whereby the corrupt encoded sub-stream is replaced with another one of the encoded sub-streams. Furthermore, operation 418 includes transmitting the replacement encoded sub-stream with the remainder of the number of encoded sub-streams (minus the corrupt encoded sub-stream) to the receiver.

As mentioned above, the flowchart of computer-implemented method 400 in FIG. 4 included parallel encoding video sequences while providing multiple simultaneous and error-resilient qualities of service, as described from the perspective of a media server. However, processes the same as, or similar to, those included in method 400 may be performed by any appropriate component in a media delivery system, e.g., including a media receiver at a receiving location. Accordingly, looking to FIG. 7, a computer-implemented method 700 for receiving and decoding sub-streams of a video stream is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, operation 702 of method 700 includes receiving a packet which includes a number of encoded sub-streams split from an original video stream. As mentioned above, encoded sub-streams may be transmitted to receiver locations over a network from a media server location. Depending on the hardware capabilities, a subscription associated with a given receiver, the available bandwidth on the network, etc., one or more of the encoded sub-streams can be received by a receiver.

Moreover, once received, operation 704 includes decoding each of the number of encoded sub-streams included in the received packet. In preferred approaches, each of the encoded sub-streams are decoded independently. Accordingly, a receiver may include multiple decoder modules (e.g., see 828 of FIG. 8 below), each of which may be used to simultaneously decode a respective sub-stream received in the packet. The ability to decode each sub-stream independently without relying on any other sub-stream offers error resilience. For instance, the video sequence may be reconstructed from any subset of sub-streams in case one or more sub-streams are corrupted or unavailable.

The sub-streams are preferably formed (split) from an original video stream by performing round-robin temporal splitting and/or round-robin spatial splitting of the images included therein. Accordingly, once the encoded sub-streams included in the received packet have been decoded, each of the decoded version of each encoded sub-stream may individually provide a unique version of the original video stream from which the respective sub-streams were split. The decoded sub-streams have a lower video quality (e.g., determined based on resolution and/or frame rate) compared to the original un-split video stream. However, as described above, merging more than one of the decoded sub-streams may provide a merged version of the video stream which has a relatively higher video quality (e.g., determined based on resolution and/or frame rate) relative to each decoded sub-stream individually.

Accordingly, operation 706 includes merging the decoded sub-streams to create a merged version of the video stream. Again, the merged version of the video stream desirably has a video quality which corresponds to a quality of service associated with the receiver, as the number of sub-streams transmitted to the receiver preferably correspond to the quality of service associated therewith. In other words, different qualities of service of a video stream encoded in one pass rather than multiple times may be received depending on a subscription associated with a given receiver location.

The merged version of the video stream may thereby be used as desired at the receiver location. For example, the merged version of the video stream may be shown on a display screen, stored in memory, streamed to another receiver which may be at another location, etc., depending on the desired embodiment.

Moreover, in addition to providing multiple simultaneous qualities of service, the present embodiment is error resilient. For instance, in the event that one of the sub-streams is corrupted over the network, there may be other redundant sub-streams available to switch to. Accordingly, method 700 also includes decision 708 which determines whether any of the number of encoded sub-streams included in the received packet are, or have become, corrupt. As shown, method 700 returns to decision 708 in response to determining that none of the encoded sub-streams are corrupt. As a result, method 700 may continue to check wither any of the received encoded sub-streams are (or become) corrupt. This process may continue to be repeated, e.g., until a new packet is received, transmissions are no longer receive, upon receiving a user command, a predetermined condition being met, etc. In some approaches, a sub-stream may be determined to be corrupt in response to a failed attempt to decode the sub-stream from its encoded form.

Alternatively, action may be taken in response to determining that at least one of the number of encoded sub-streams received in the packet is corrupt. As shown, in some approaches, the action taken may include sending a request to a media server (preferably from which the packet was originally received) that the corrupted encoded sub-stream be replaced by another encoded sub-stream from the same video stream. See operation 710. In some instances, the sub-stream determined to be corrupt may be reevaluated after an amount of time has passed, e.g., if a replacement sub-stream is not available and/or has not yet been received. In other approaches, the action taken may include dropping the corrupt encoded sub-stream, preferably without causing a lapse in video reception. Corrupt encoded sub-streams may be dropped for video streaming of live video sequences, whereby the encoded frame corresponding to the corrupt packet may simply be ignored and the process continued with appropriate steps taken to compensate for the ignored (lost) frame. In yet other approaches, alternative courses of action, e.g., selected from a group of actions which would be apparent to one skilled in the art after reading the present description, may be taken in response to determining that one or more of the sub-streams included in a packet are corrupt.

Figure 8A:
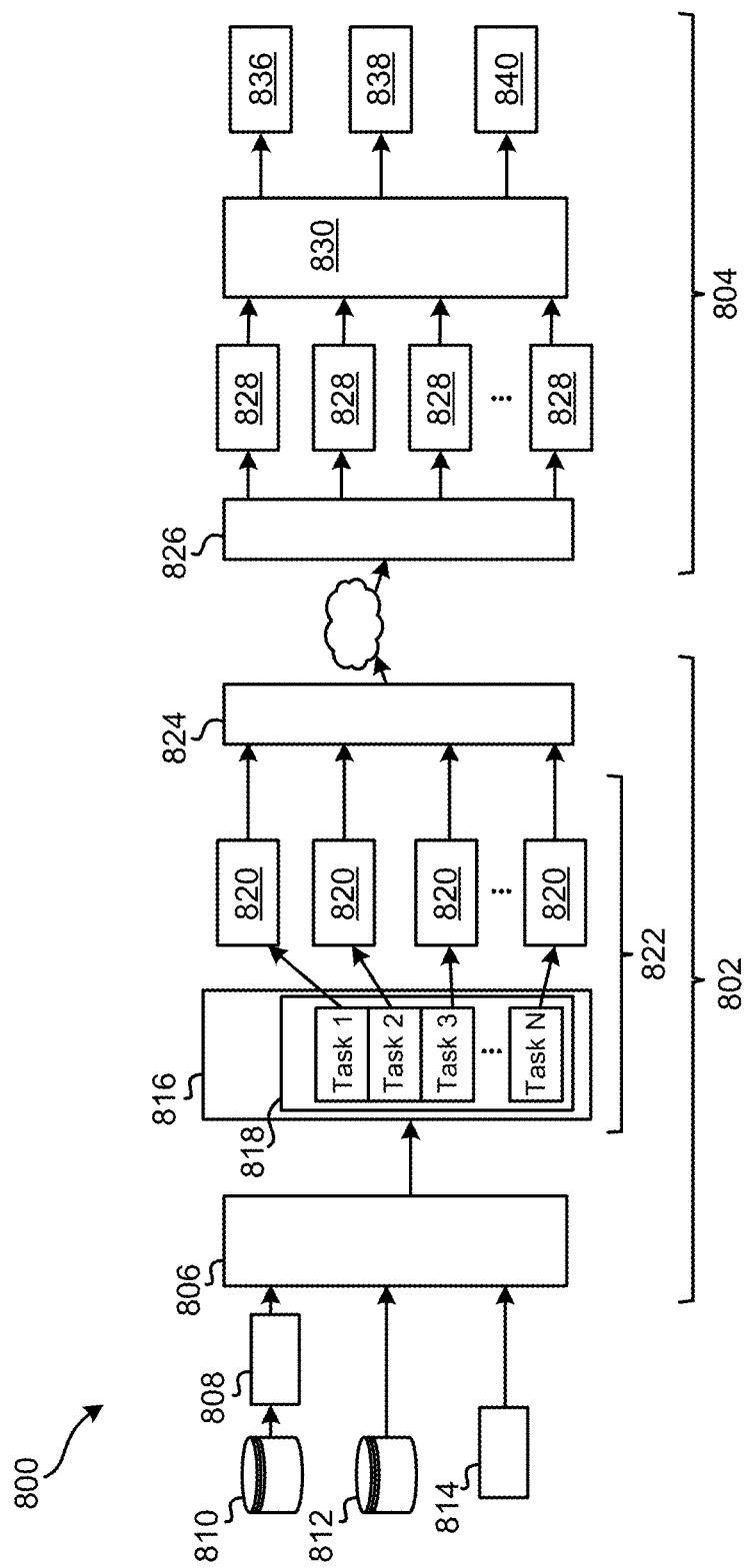
FIG. 8A is a representational view of a system in accordance with one embodiment.
Figure 8B:
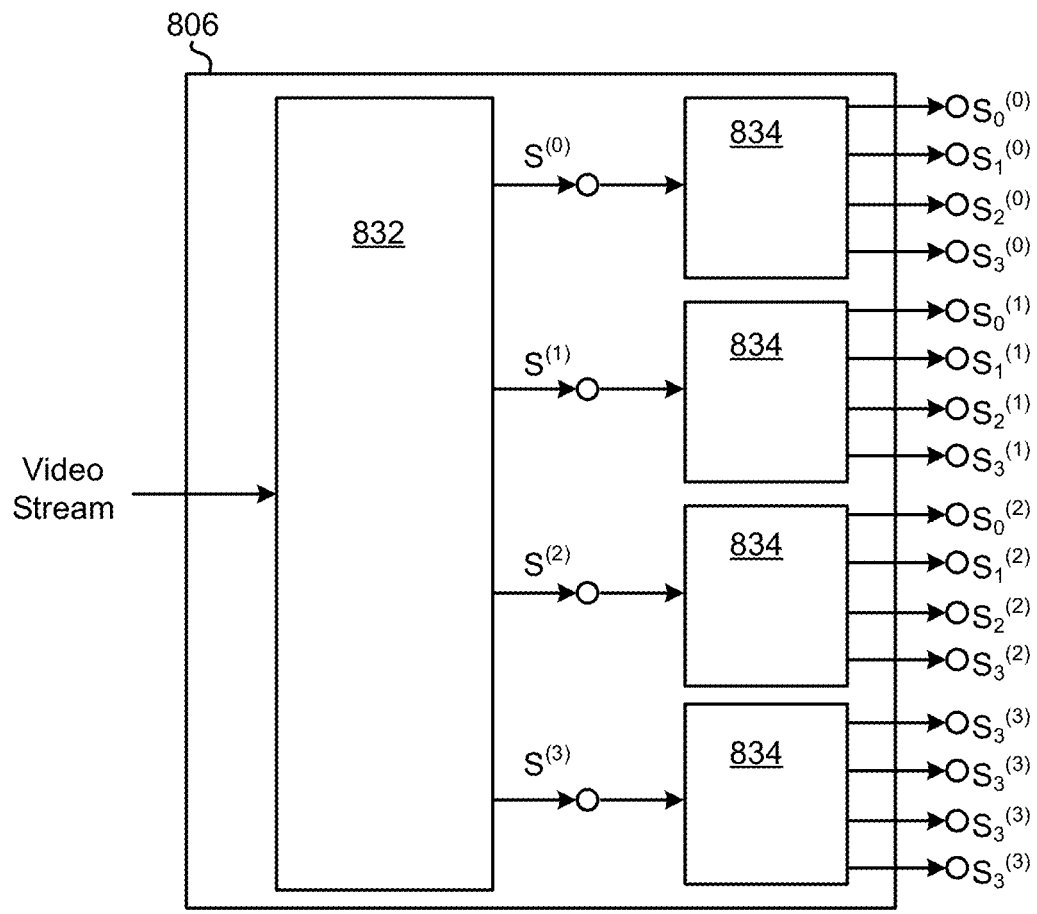
FIG. 8B is a detailed schematic view of a media splitter module from FIG. 8A in accordance with one embodiment.

Looking now to FIG. 8A, an exemplary system 800 is shown in accordance with one embodiment. As an option, the present system 800 may be implemented in conjunction with features from any other embodiment listed herein, such as those described with reference to the other FIGS., such as FIGS. 4-7. However, such system 800 and others presented herein may be used in various applications and/or in permutations which may or may not be specifically described in the illustrative embodiments listed herein. Further, the system 800 presented herein may be used in any desired environment. Thus FIG. 8A (and the other FIGS.) may be deemed to include any possible permutation.

As shown system 800 includes a media server 802 and a receiver 804 (e.g., media client). The media server 802 includes a media splitter 806 which may receive video streams from a number of different sources. In some approaches, video streams may be received at the media splitter 806 from a decoder module 808 which has decoded an encoded video file from memory 810. In other approaches, video streams may be received at the media splitter 806 as a raw video file from a storage database 812, a live video file received at the media splitter 806 from a remote media capturing device 814 which has broadcasting capabilities, etc.

The media splitter 806 splits the video stream into sub-streams according to any of the approaches described herein, e.g., by implementing round-robin spatial splitting and/or temporal round-robin splitting. Referring momentarily to FIG. 8B, a detailed schematic view of the media splitter 806 is shown in accordance with one embodiment, which is in no way intended to limit the invention. As shown, media splitter 806 first passes the received video stream through a temporal splitter 832, which splits the video stream into four sub-streams $S^{(0)}$-$S^{(3)}$ (e.g., as seen in FIG. 5A above).

Moreover, each of the sub-streams are then provided to a respective spatial splitter 834, each of which further split the sub-streams as designated by $S^{(0)}$-$S^{(3)}$.

Referring again to FIG. 8A, the outputs from the media splitter 806 are then sent to the session and task scheduler module 816 which manages each sub-stream as a task-based session, e.g., see Task 1-Task N in session module 818. From there, each sub-stream is encoded in parallel in a series of task executor modules 820. As shown, the task executor modules 820 in addition to the session and task scheduler module 816 make up a distributed application manager 822 according to an illustrative approach. Furthermore, each of the encoded sub-streams are then sent to the packetizing module 824 which combines the corresponding encoded sub-streams in a packet.

The packet is then transmitted to an intended receiver 804, e.g., using an antenna, network, or any transmission processes which would be apparent to one skilled in the art after reading the present description. Once received, de-packetizing module 826 is used to de-packetize the packet, and then send each of the encoded sub-streams in the packet to a respective decoder module 828. The decoder module 828 are preferably used to decode the encoded sub-streams in parallel (e.g., simultaneously), after which the decoded versions of the sub-streams are sent to a media merger module 830. As described above, more than one sub-stream may be merged together to improve the resulting video quality. The media merger 830 then provides the merged version of the sub-streams to a desired device 836, 838, 840, such that the merged version of the sub-streams may be displayed (shown), e.g., depending on a quality of service associated with each of the devices 836, 838, 840.

According to an exemplary in-use embodiment which is in no way intended to limit the invention, three different qualities of service may be implemented, where "Bronze" designates the lowest offered quality of service, "Silver" designates the middle offered quality of service, and "Gold" designates the highest offered quality of service. Under the Bronze quality of service, only one sub-stream may be received and decoded, thereby providing the most basic quality of service. However, for the Silver service, more than one sub-stream may be received, decoded and merged respectively. For the Gold service, all sub-streams may be received, decoded, and merged respectively. For sub-streams which include three images (frames) each split using a round-robin temporal splitting process, effective independent random access points are four sub-stream lengths apart, or 128 images (frames) in the present in-use example.

This improved performance is particularly desirable for techniques which are able to implement an adjustable quality of service aspect. For instance, it is desired that the high bit-rate video data in HD, 4K, 3D, etc. representations associated with mobile user be transcoded to a low bit-rate format that is error resilient and scalable. In other words, it is desirable that the transcoded format is capable of adjusting to the network and/or receiver's specifications, while preserving the perceived video quality as much as possible. Such efficient solutions are achievable by some of the embodiments described herein, e.g., particularly when implemented in conjunction with large-scale cloud computing infrastructures such as IBM Platform Symphony.

It follows that various embodiments described herein include processes, and/or systems for implementing such processes, which are able of providing multiple simultaneous and error-resilient qualities of service by performing parallel encoding (or transcoding) of video sequences, e.g., in a distributed environment. In other words, multiple simultaneous qualities of service may be achieved by encoding multiple parallel sub-streams in a single encoding step (pass). As described above, a video stream may be split such that sub-streams may be used for delivering different video qualities to different receiver locations based on a qualities of service associated with each of the receiver locations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, a wireless network, etc., and/or some combination thereof, or other networking modalities. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
splitting a video stream into a plurality of sub-streams;
encoding each of the sub-streams; and
transmitting a packet to a receiver, wherein the packet includes a number of the encoded sub-streams, wherein the number of the encoded sub-streams included in the packet transmitted to the receiver corresponds to a quality of service associated with a service cost incurred by the receiver.

2. The computer-implemented method of claim 1, wherein splitting the video stream includes performing a temporal round-robin splitting of the video stream, wherein each of the sub-streams individually provide a unique version of the video stream having a lower video quality.

3. The computer-implemented method of claim 2, wherein splitting the video stream includes:
performing a spatial splitting of the video stream, wherein the spatial splitting is performed on frames of the sub-streams obtained by the temporal round-robin splitting.

4. The computer-implemented method of claim 1, wherein splitting the video stream includes performing a spatial splitting of the video stream, wherein the spatial splitting is performed on frames of the sub-streams by selecting certain pixels in each of the frames and grouping corresponding pixels selected from the same frame together to form a lower resolution version of the respective frame.

5. The computer-implemented method of claim 1, comprising:
managing the encoding of each of the sub-streams in parallel,
wherein each of the sub-streams are encoded in parallel,
wherein each sub-stream is managed as a task-based session,
wherein managing the encoding includes applying different scheduling policies to each of the different task-based sessions,
wherein each of the scheduling policies designated a time at which to encode the respective sub-stream,
wherein the encoding is performed using a distributed system.

6. The computer-implemented method of claim 1, comprising:
determining that one of the number of the encoded sub-streams in the packet transmitted to the receiver is corrupt; and
performing an action in response to determining that one of the number of the encoded sub-streams in the packet transmitted to the receiver is corrupt, the action being selected from the group of actions consisting of: replacing the corrupt encoded sub-stream with an appropriate one of the encoded sub-streams, and dropping the corrupt encoded sub-stream without causing a lapse in video reception.

7. The computer-implemented method of claim 1, comprising:
transmitting a plurality of packets to a plurality of receivers, each of the plurality of packets including a number of the encoded sub-streams,
wherein the number of the encoded sub-streams in each of the packets corresponds to a quality of service associated with a service cost incurred by the respective receiver,
wherein the number of the encoded sub-streams included in each of the packets transmitted differentiates between different qualities of service.

8. A computer-implemented method, comprising:
receiving a packet which includes a number of encoded sub-streams split from a video stream;
decoding each of the encoded sub-streams; and
merging the decoded sub-streams to create a merged version of the video stream, the merged version having a video quality which corresponds to a quality of service associated with the receiver, wherein the quality of service associated with the receiver corresponds to a service cost incurred by the receiver.

9. The computer-implemented method of claim 8, wherein decoding each of the encoded sub-streams includes using multiple decoders to independently and simultaneously decode each of the encoded sub-streams.

10. The computer-implemented method of claim 8, comprising:
determining that one of the number of the encoded sub-streams in the received packet is corrupt;
sending a request that the corrupt encoded sub-stream be replaced by another encoded sub-stream;
receiving one or more instructions to ignore the corrupt encoded sub-stream;
in response to receiving the one or more instructions, ignoring the corrupt encoded sub-stream; and
compensating for the ignored corrupt encoded sub-stream.

11. The computer-implemented method of claim 8, comprising:
determining that one of the number of the encoded sub-streams in the received packet is corrupt; and
sending a request that the corrupt encoded sub-stream be replaced by another encoded sub-stream,
wherein the number of encoded sub-streams included in the packet is adjustable in real time based on one or more network conditions,
wherein adjusting the number of encoded sub-streams included in the packet in real time does not cause any lapse in video reception,
wherein decoding each of the encoded sub-streams includes using multiple decoders to independently and simultaneously decode each of the encoded sub-streams.

12. The computer-implemented method 11, wherein a video quality of a version of the video stream is determined based on a frame rate and/or a resolution of the version of the video stream.

13. A computer program product comprising a computer readable storage medium having program instructions embodied therewith, the program instructions readable and/or executable by a processor to cause the processor to:
split, by the processor, a video stream into a plurality of sub-streams;
encode, by the processor, each of the sub-streams; and
transmit, by the processor, a packet to a receiver, wherein the packet includes a number of the encoded sub-streams,
wherein the number of the encoded sub-streams included in the packet transmitted to the receiver corresponds to a quality of service associated with a service cost incurred by the receiver.

14. The computer program product of claim 13, wherein splitting the video stream includes performing a temporal round-robin splitting of the video stream, wherein splitting the video stream includes performing a spatial splitting of the video stream, wherein the spatial splitting is performed on frames of the sub-streams obtained by the temporal round-robin splitting.

15. The computer program product of claim 13, wherein splitting the video stream includes performing a spatial splitting of the video stream, wherein the spatial splitting is performed on frames of the sub-streams by selecting certain pixels in each of the frames and grouping corresponding pixels selected from the same frame together to form a lower resolution version of the respective frame.

16. The computer program product of claim 15, wherein the lower resolution versions of the respective frames correspond to independent representations of the video stream, the independent representations having a lower video quality than the video stream.

17. The computer program product of claim 13, the program instructions readable and/or executable by the processor to cause the processor to:
   manage, by the processor, the encoding of each of the sub-streams in parallel,
   wherein each of the sub-streams are encoded in parallel,
   wherein each sub-stream is managed as a task-based session,
   wherein managing the encoding includes applying different scheduling policies to each of the different task-based sessions,
   wherein each of the scheduling policies designated a time at which to encode the respective sub-stream,
   wherein the encoding is performed using a distributed system.

18. The computer program product of claim 13, the program instructions readable and/or executable by the processor to cause the processor to:
   determine, by the processor, that one of the number of the encoded sub-streams in the packet transmitted to the receiver is corrupt;
   send, by the processor, one or more instructions to ignore the corrupt encoded sub-stream, thereby causing the quality of service at the receiver to temporarily fall below a quality of service associated with the service cost incurred by the receiver;
   replace, by the processor, the corrupt encoded sub-stream with another one of the encoded sub-streams; and
   transmit, by the processor, the replacement encoded sub-stream along with a remainder of the encoded sub-streams in the packet to the receiver, thereby restoring the quality of service at the receiver to the quality of service associated with the service cost incurred by the receiver.

19. The computer program product of claim 18, the program instructions readable and/or executable by the processor to cause the processor to:
   terminate, by the processor, transmission of the corrupt encoded sub-stream in the packet.

20. The computer program product of claim 13, the program instructions readable and/or executable by the processor to cause the processor to:
   transmit, by the processor, a plurality of packets to a plurality of receivers, each of the plurality of packets including a number of the encoded sub-streams,
   wherein the number of the encoded sub-streams in each of the packets corresponds to a quality of service associated with a service cost incurred by the respective receiver,
   wherein the number of the encoded sub-streams included in each of the packets transmitted differentiates between different qualities of service.

\* \* \* \* \*